United States Patent [19]

Lawrence et al.

[11] Patent Number: 4,674,881
[45] Date of Patent: Jun. 23, 1987

[54] OPEN LOOP THIN FILM LASER GYRO

[75] Inventors: Anthony W. Lawrence, Walpole; John R. Haavisto, Scituate; Timothy Williams, Walpole, all of Mass.

[73] Assignee: Northrop Corporation, Los Angeles, Calif.

[21] Appl. No.: 603,771

[22] Filed: Apr. 25, 1984

[51] Int. Cl.⁴ .......................... G01B 9/02; H01S 3/083
[52] U.S. Cl. ....................................... 356/350; 372/94
[58] Field of Search ........................... 356/350; 372/94

[56] References Cited

U.S. PATENT DOCUMENTS 3,890,047 6/1975 Warner ............................... 356/350
4,326,803 4/1982 Lawrence ........................... 356/350

Primary Examiner—Stephen C. Buczinski
Assistant Examiner—Linda J. Wallace
Attorney, Agent, or Firm—Kenway & Jenney

[57] ABSTRACT

The laser gyro includes a laser and a ring resonator. Apparatus is provided for coupling counter-propagating beams of light from the laser into the resonator. The frequency of the laser is scanned across the resonance frequency of the resonator in steps superimposed on a dc level. The intensity of light in one of the counter-propagating beams is detected during each of the steps and the difference in intensity of the detected light is determined. The difference in the intensity of the detected light is used to alter the dc level of the steps so as to drive the difference to zero. The intensity of light in the other of the counter propagating beams is detected during each of the steps and the difference in intensity is also detected. This difference is indicative of the rotation rate of the gyro.

12 Claims, 10 Drawing Figures

OPEN LOOP THIN FILM LASER GYRO

BACKGROUND OF THE INVENTION

This invention relates to the detection of angular rate and more particularly to an open loop laser gyro.

In general, laser gyros operate by arranging a laser to inject counter-propagating beams of light into a ring resonator. If the frequency of the injected light is such that an integral number of wavelengths fit within the ring resonator, the ring will be in resonance. When the ring has an angular velocity, the apparent path length for radiation traveling in the direction of rotation will be longer than that for radiation traveling in the opposite direction. The change in apparent path length will disturb the resonance condition. The resonance condition can be re-established by altering the frequency of light injected into the ring. The frequency change needed to re-establish resonance is then a measure of the angular rate of the ring.

In closed loop laser gyros, the frequency of the light injected into the ring is altered, often using acousto-optic frequency shifters, to maintain the ring on resonance. These gyros are closed loop in the sense that the injected frequency is varied so as to maintain the resonator on resonance during ring rotation. One such known closed loop laser gyro is disclosed in U.S. Pat. No. 4,326,803. In addition to the laser and the ring resonator, this gyro requires a pair of frequency shifters for its operation, which adds to its cost and complexity.

It is an object of this invention to provide an open loop laser gyro which eliminates the need for frequency shifters.

It is a further object of the invention to provide a thin film laser gyroscope which is simpler and substantially less costly than those known in the prior art.

Yet another object of the invention is a laser gyroscope which can be implemented utilizing thin film technology.

SUMMARY OF THE INVENTION

The open loop laser gyro according to the present invention includes a laser and a ring resonator. Coupling apparatus is provided for coupling counter-propagating beams of light from the laser into the resonator. The frequency of the laser is scanned across the resonance frequency of the resonator in steps superimposed on a dc level, and the intensity of light in one of the counter-propagating beams is detected during the steps. Apparatus is provided for determining the difference in intensity of this detected light during the steps. Electronics responsive to this difference is used to alter the dc level of the steps to drive the difference to zero. The intensity of light in the other of the counter-propagating beams is then detected during the steps and the difference in intensity is determined for this beam. This difference is indicative of the rotation rate of the gyro.

In one preferred embodiment, first and second input waveguide couplers are provided for coupling counter-propagating beams from the laser into the resonator. In this embodiment, apparatus is provided for detecting the intensity of light in one of the input couplers during the steps. The difference in intensity is determined and electronics is provided responsive to the difference to alter the dc level of the steps to drive the difference to zero. The intensity of light in the other of the input couplers is also detected during the steps and the difference in intensity is indicative of the rotation rate of the gyro.

BRIEF DESCRIPTION OF THE DRAWING

The invention disclosed herein will be better understood with reference to the drawing of which.

DESCRIPTION OF THE PREFERRED EMBODIMENT

Figure 1:
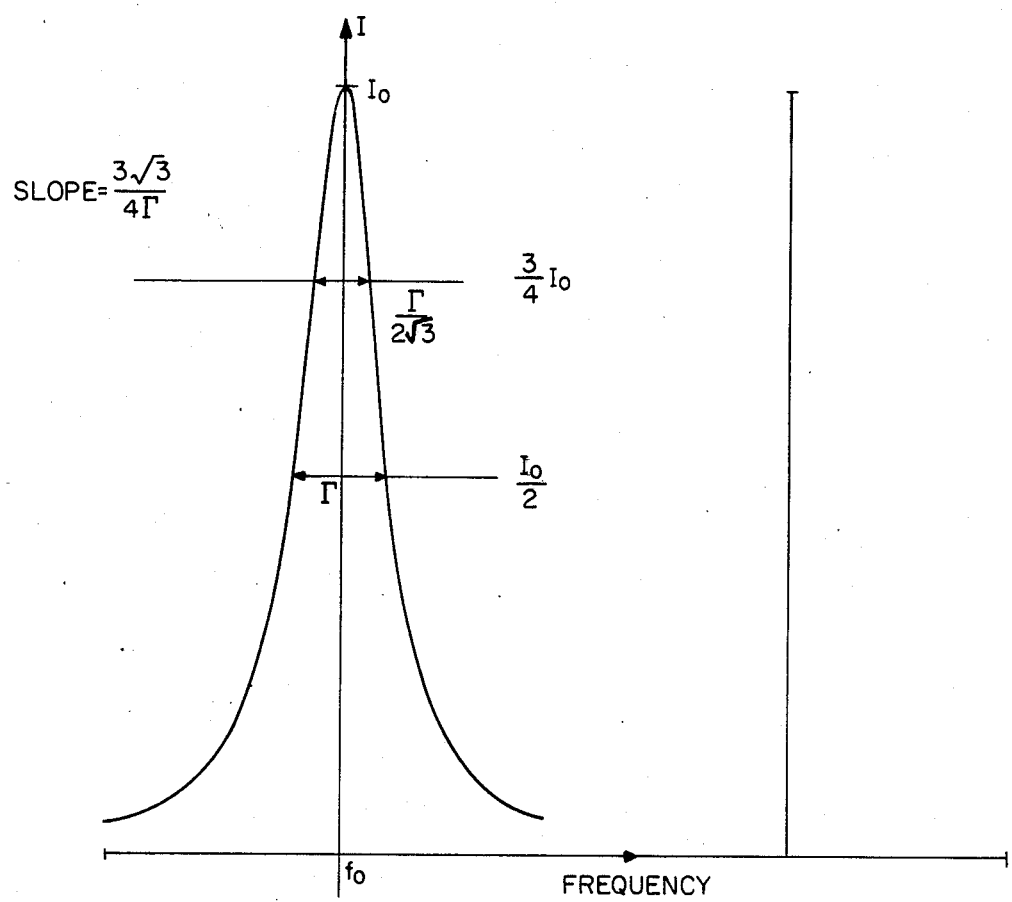
FIG. 1 is a graph of frequency versus intensity for a ring resonator.

The theory of operation of the laser gyros disclosed and claimed herein will be discussed first with reference to FIGS. 1, 2 and 3. The intensity of light within a ring resonator 10 in FIG. 3 depends on the light frequency with respect to the resonant frequency of the resonator 10, $f_0$, and the linewidth gamma of the resonator. As shown in FIG. 1, the maximum intensity $I_0$ occurs when the frequency of light traveling in the resonator 10 has a frequency $f_0$. As the frequency varies away from the resonant frequency $f_0$, the intensity drops off rather steeply. In particular, near resonance, the relationship between the intensity in the waveguide resonator 10 and an input intensity is given by $$I = \frac{I_{out}}{I_{in}} = \frac{1}{1 + 4/\Gamma^2 (f - f_0)^2}$$

Gamma is the linewidth, that is, the width of the curve in FIG. 1 at an intensity of $I = I_0/2$. The derivative of I with frequency is given by $$\frac{dI}{df} = -\frac{8}{\Gamma^2} \frac{f - f_0}{(1 + 4/\Gamma^2 (f - f_0)^2)^2}$$

The maximum slope is at the $\frac{3}{4}$ power point where $$\left| \frac{dI}{df} \right|_{\frac{3}{4}I_0} = \frac{3\sqrt{3}}{4\Gamma}$$

Thus, at the $\frac{3}{4}$ power point where the slope is maximum, small frequency changes result in large changes in the intensity of light in the resonator 10. This sensitivity of intensity to small changes in frequency can be utilized to make an open loop laser gyro.

The technique for employing changes in intensity with small changes in frequency will now be discussed with reference to FIG. 2. As in FIG. 1, a curve 12 is a plot of intensity of light in the waveguide resonator 10 as a function of frequency. If the frequency of a laser such as a laser 14 in FIG. 3 is varied as shown by a curve 16 in FIG. 2, the intensity of light in the ring resonator 10 will vary. In particular, the laser 14 is operated at a frequency below the frequency $f_0$ during the time interval $T_1$ and at a frequency greater than $f_0$ during the interval $T_2$ with the alternation continuing with time as shown. The alternating steps of the curve 16 have a dc level indicated by the offset in FIG. 2. During the times $T_1$ when the laser is operated at a frequency below $f_0$, the resulting intensity in the waveguide resonator 10 is found by the intersection of a line 18 with the curve 12 which is at a point 20. Similarly, during the time intervals $T_2$ the intensity within the waveguide resonator 10 is determined by the intersection of a line 22 with the curve 12 which occurs at a point 24. Thus, during the time interval $T_1$, the intensity in the resonator 10 will have a value represented by the point 20 and during the time period $T_2$, the intensity will have a value indicated by the point 24. If the dc level of the curve 16, that is the offset shown in FIG. 2, is driven towards zero by changing the laser frequencies above and below $f_0$, the point 20 will move upwardly toward the location 26 and the point 24 will move downwardly toward the location 28. Because of the symmetry of the curve 12, the points 26 and 28 are at the same intensity.

A discussion of a laser gyro 30 (FIG. 3) will indicate how the foregoing theoretical development is utilized in a laser gyro. The laser gyro 30 includes the waveguide resonator 10 and the laser 14 which is preferably a gallium aluminum arsenide diode laser. The output of the diode laser 14 travels along an input waveguide coupler 32. The waveguide coupler 32 is located in close proximity to a second input waveguide coupler 34. By the mechanism of evanescent coupling, light traveling in the waveguide 32 will be coupled into the waveguide 34. The waveguides 32 and 34 are arranged so that approximately half of the light energy from the laser diode 14 will travel in the input coupler 32 and half of the light energy will travel in the input coupler 34. Because of the half-and-half sharing of the energy, the waveguide couplers 32 and 34 may be thought to be coupled by a 3 dB coupler. For the moment, consider light traveling along the input coupler 34. Again, by the mechanism of evanescent coupling, light traveling in the waveguide 34 will couple into the waveguide resonator 10 at the location 36. This light will propagate in a clockwise fashion around the waveguide resonator 10. An output coupler 38 is also coupled to the waveguide resonator 10 so that light propagating clockwise in the waveguide resonator 10 will couple into the output coupler 38 and be detected by a detector 40.

Figures 2, 2A:
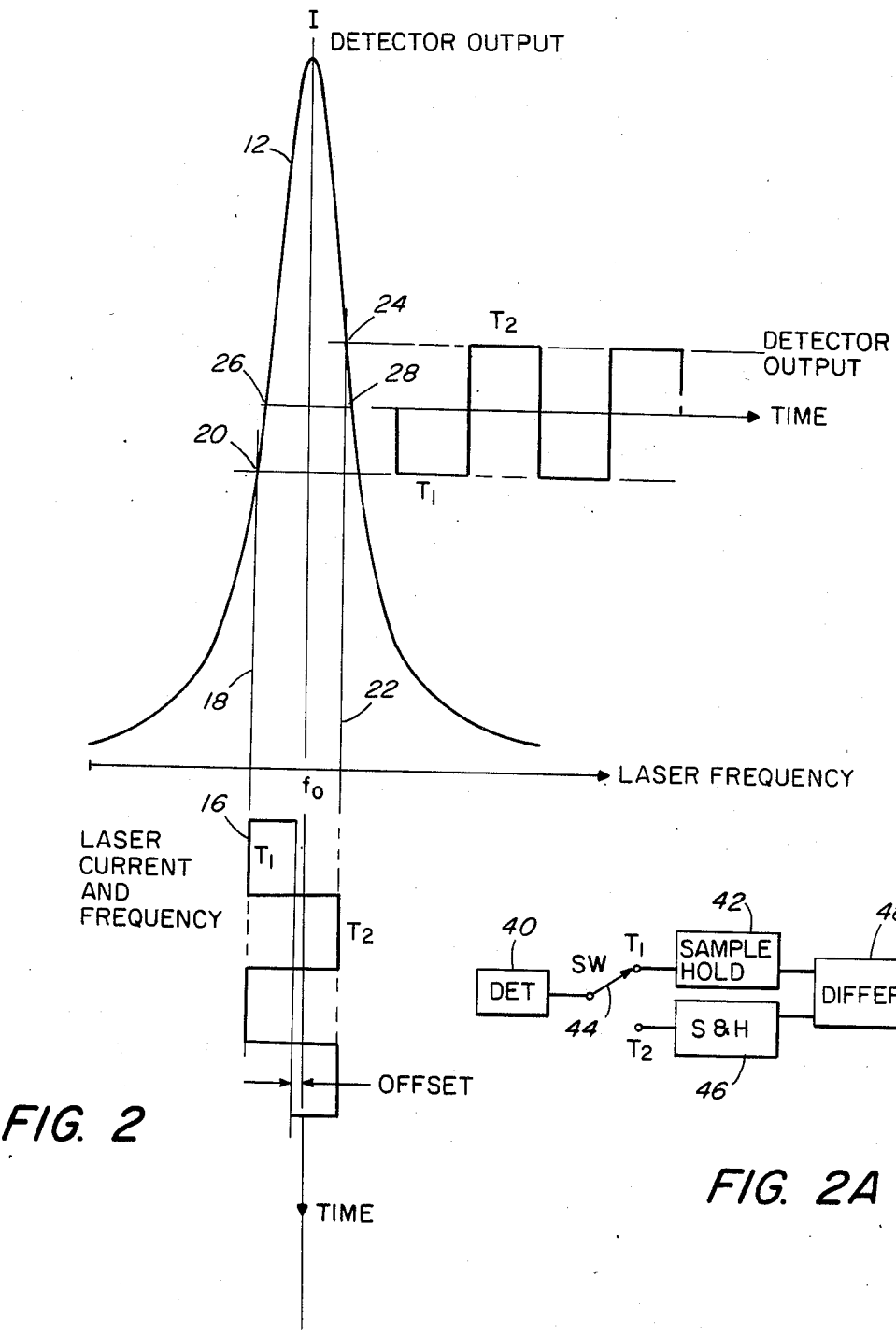
FIG. 2 is a graphical representation of the laser scanning technique disclosed herein.
FIG. 2a is a schematic diagram of one way of obtaining a difference in intensity used with the technique of FIG. 2.

It is important to remember that the laser 14 is operated by varying its frequency above and below the resonating frequency $f_0$ of the waveguide resonator 10, as shown in FIG. 2. Thus, during a time $T_1$, the detector 40 will detect the intensity of light in the waveguide resonator when the laser 14 is operating below the resonant frequency $f_0$. Similarly, during time $T_2$, the detector 40 will detect intensity in the resonator when the laser frequency is above $f_0$. As shown in FIG. 2a, the output of the detector 40 is switched into a sample-and-hold element 42 during the time $T_1$ by means of a switch 44 and is switched into the sample-and-hold element 46 during the time $T_2$ and a difference in the two signals is computed by a difference network 48. The output from the difference network 48 becomes a first input 50, FIG. 3, into a servo amplifier 52. The other input 54 to the servo amplifier 52 is the output from a detector 56 which monitors the intensity of the laser diode 14. In this way, the signal 50 is normalized with respect to the output of the laser diode 14. The output of the servo amplifier 52 is thus a normalized signal 58 which is used to vary the dc level of the alternating steps shown in the curve 16 in FIG. 2.

Figure 3:
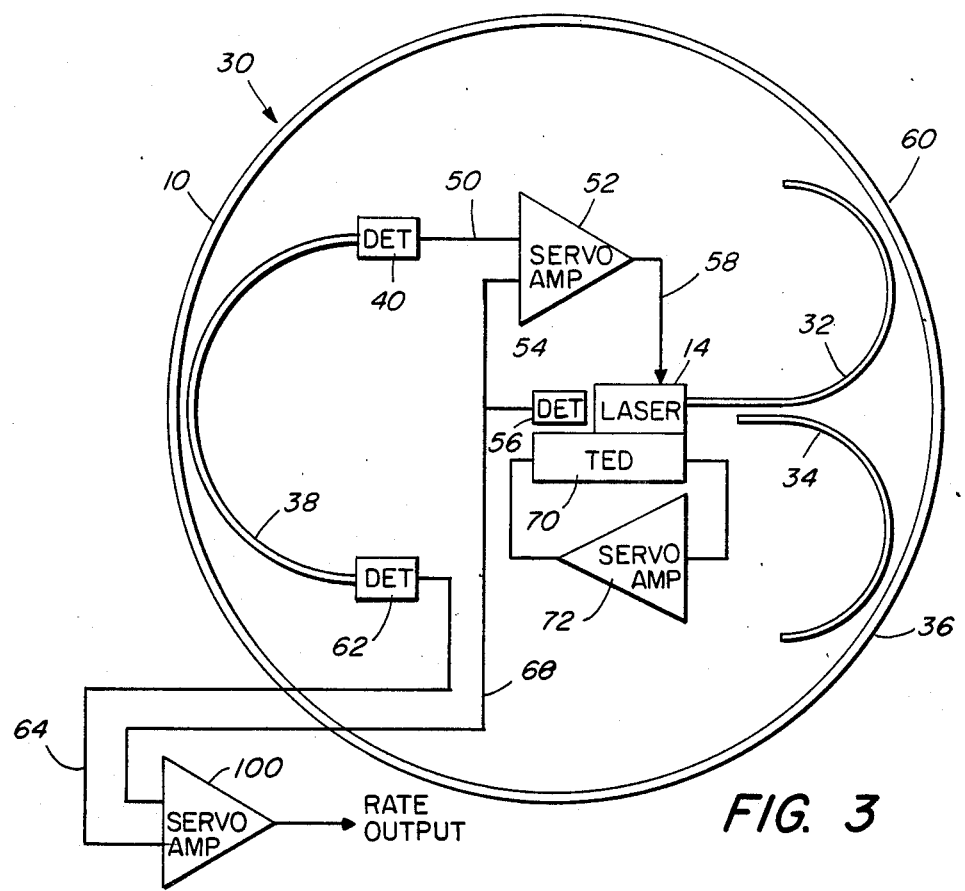
FIG. 3 is a schematic representation of one embodiment of a laser gyro disclosed herein.

If the laser gyroscope 30 has an angular velocity in the plane of FIG. 3, the apparent path length in the waveguide resonator 10 will change because of the rotation rate. The change in path length will then disturb the resonance condition away from $f_0$. The control scheme described above will then alter the dc level of the steps of the curve 16 to drive the points 20 and 24 (FIG. 2) into coincidence with respect to the new resonance frequency. At this point, consider the light traveling in the input coupler 32. This light will be coupled into the waveguide resonator 10 at a location 60 and will travel in the waveguide resonator 10 in a counterclockwise direction. The light traveling in the counterclockwise direction will couple into the output coupler 38 and be detected by a detector 62. Because of the rotation of the gyro 30, resonance conditions will be different for this counterclockwise propagating beam, allowing a determination of rotation rate to be made. The output of the detector 62 is sampled in the same manner as shown in FIG. 2a and becomes an input 64 to a second servo amplifier 66. Another input 68 to the servo amplifier 66 is the output from the detector 56. The output from the servo amplifier 66 is thus a normalized difference signal indicating the difference in intensity of the counterclockwise propagating beam during the times $T_1$ and $T_2$. This difference is indicative of the angular rate of the laser gyro 30.

Still referring to FIG. 3, the laser diode 14 is mounted on a thermoelectric device 70, such as a Peltier cooler. The thermoelectric device 70 includes apparatus for measuring the temperature of the laser 14, and this measured temperature signal serves as the input to a servo amplifier 72 which acts in a closed loop fashion to maintain the laser diode 14 at a constant temperature. This temperature servo is necessary to prevent the laser diode 14 from changing longitudinal mode ("mode hopping").

It should be understood that the demodulator illustrated in FIG. 2a may be configured in other ways, such as digitally using a voltage-to-frequency converter driven by the detector signal. In such a case, the voltage-to-frequency output is counted in a up-down counter, up counts during $T_1$, down counts during $T_2$. The resulting count is latched out and is the integrated error signal. The three coupler laser gyro 30 shown in FIG. 3 has the advantage over known two coupler gyros in that since there are no frequency shifters between the laser and the input coupler, the problem of a resonant loop or cavity coupled into the laser is removed. That is, the arrangement provides isolation.

The laser gyro 30 of FIG. 3 can be considered "direct" in that it uses the transmitted Fabry-Perot signals at the detectors 40 and 62, which signals rise to a peak at resonance as shown in FIGS. 1 and 2. When the signals sensed at detectors 40 and 62 rise to a peak at resonance, the light intensity in the input couplers 32 and 34 falls to a minimum since at resonance substantially all of the light energy is in the waveguide resonator 10. This fact suggests an "inverse" operation which will now be discussed with reference to FIG. 4. An open loop thin film laser gyro 80 includes a ring waveguide resonator 82 and a laser diode 84. A pair of input couplers 86 and 88 are provided for coupling light energy from the laser diode 84 into the waveguide resonator 82. As with the embodiment of FIG. 3, the input couplers 86 and 88 are arranged so that approximately half of the energy from the laser diode 84 propagates in the input coupler 86 and the other half in the input coupler 88. The couplers 86 and 88 are located with respect to the waveguide resonator 82 so that light is coupled into the waveguide resonator. The input coupler 88 terminates at a detector 90 and the input coupler 86 terminates at a detector 92. The laser diode 84 is mounted on a thermoelectric device 94 to control the temperature of the laser diode. A detector 96 is provided to monitor the output of the laser diode 84 for normalization purposes as with the embodiment of FIG. 3.

In operation, the laser diode 84 operates in the same step fashion as in the embodiments illustrated in FIGS. 2 and 3. In this case, however, the output from detector 90 is utilized to change the dc level of the output of the laser diode 84. Of course, the signal at the detector 90 will be the inverse of the waveform 12 shown in FIG. 2. That is, when resonance conditions are met in the waveguide resonator 82, the detector 90 will indicate a minimum. Thus, when the laser gyro 80 has an angular velocity, a servo amp 98 will adjust the dc level of the step changes in frequency to maintain the clockwise propagating beam tuned to the ring resonance. The detector 92 will then see a signal which is indicative of the angular rate of the gyro 80. It should be noted that the embodiment of FIG. 4 does not require an output coupler as in the embodiment of FIG. 3 and so is simpler and will be less costly to manufacture.

Figure 4:
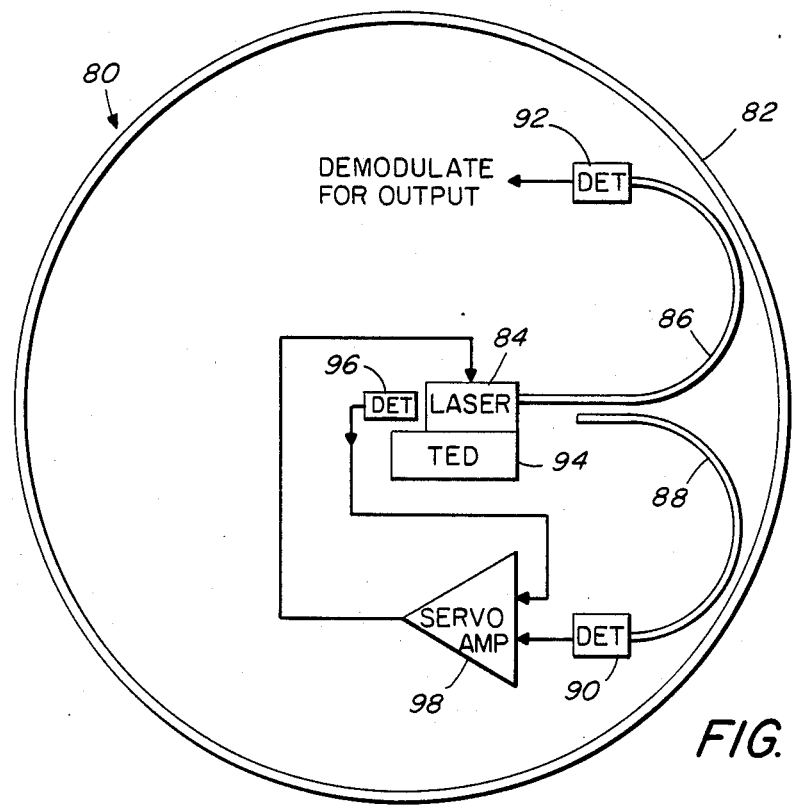
FIG. 4 is a schematic representation of a laser gyro for inverse operation.
Figure 5:
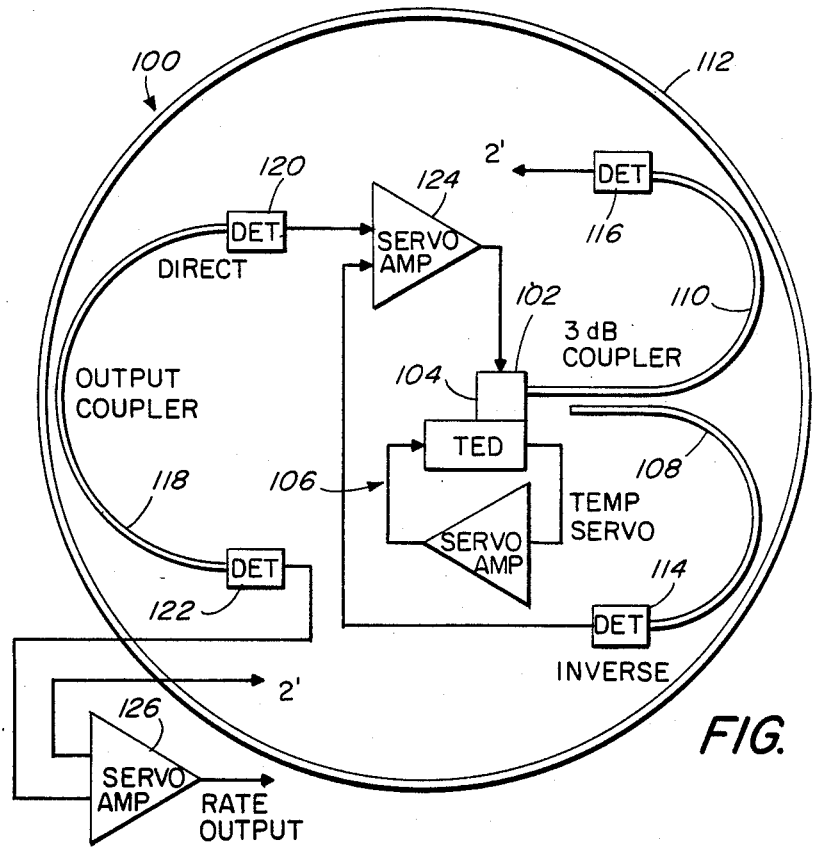
FIG. 5 is a schematic diagram of a laser gyro for both direct and inverse operation.

FIG. 5 illustrates an embodiment of the invention which combines the "direct" and "inverse" gyros shown in FIGS. 3 and 4. Since both the "direct" and "inverse" signals occur independently, they may be combined to improve the sensitivity of a laser gyro 100. As will be seen, this embodiment eliminates the need for a detector for sensing the laser output for normalizing purposes. This embodiment also eliminates any spurious rate signals resulting from differential intensity fluctuations. The laser gyro 100 includes a laser diode 102 mounted on a thermoelectric device 104. The thermoelectric device 104 is controlled by a temperature servo indicated generally at 106. The laser diode 102 emits light which propagates in input couplers 108 and 110. The input couplers 108 and 110 are located for the coupling of light into a waveguide resonator 112. The input couplers 108 and 110 are terminated with detectors 114 and 116 respectively. An output coupler 118 terminates at detectors 120 and 122.

The operation of the laser gyro 100 will now be discussed. Light propagating in the input coupler 108 is evanescently coupled into the waveguide resonator 112 generating a clockwise propagating beam. This clockwise propagating beam will couple into the output coupler 118 and be detected by the detector 120. The output of the detector 120 is compared with the output of the detector 114 which is responsive to light energy in the input coupler 108. A servo amp 124 generates an error signal for controlling the dc level of the frequency steps of the laser diode 102 in the same fashion as discussed with reference to the embodiment of FIG. 3. Thus, the dc level of the step waveform of the laser output is tuned to the resonance of the waveguide resonator 112. The output of the detector 122 responsive to a counterclockwise beam is compared with the output of the detector 116 in an op amp 126, the output of which is indicative of the angular velocity of the laser gyro 100. The gyro 100 will have greater sensitivity and eliminates the need for a normalizing detector.

In the laser gyro embodiments of FIGS. 3, 4 and 5, maximum sensitivity is obtained if the peak-to-peak laser frequency swing or steps is equal to the width of the resonator line at the $\frac{3}{4}$ power points shown in FIG. 1, and is given by the following equations:

$$\frac{dI}{df} = \frac{3\sqrt{3}}{2\Gamma} \; ; \; \frac{df}{d\Omega} = \frac{d}{\eta\lambda} \; ; \; \frac{dI}{d\Omega} = \frac{3\sqrt{3}}{2} \; \frac{d}{\eta\lambda\Gamma}$$

In these equations, d is the diameter of the waveguide resonator, n is the effective refractive index of the resonator, lambda is wavelength and omega is angular rate. Calculations show that a 1″ diameter resonator can have a resolution, limited by shot noise, of 0.1° per second with 1 milliwatt of power at 800 nm wavelength. The linewidth of such a resonator is approximately 80 megahertz. For such a gyro, the rate sensitivity would then be $$(dI/D\Omega) = 1.1 \times 10^{-5} \text{ per °/sec.}$$

For an angular rate of ±1000° per second, the change in intensity will be approximately 0.01, a small deviation on the output curve. At the $\frac{3}{4}$ power point, the width of the ring resonance is 24 megahertz so that the current swing required as an input to a laser diode is in the range of 0.016 milliamps, which is feasible.

Figure 6:
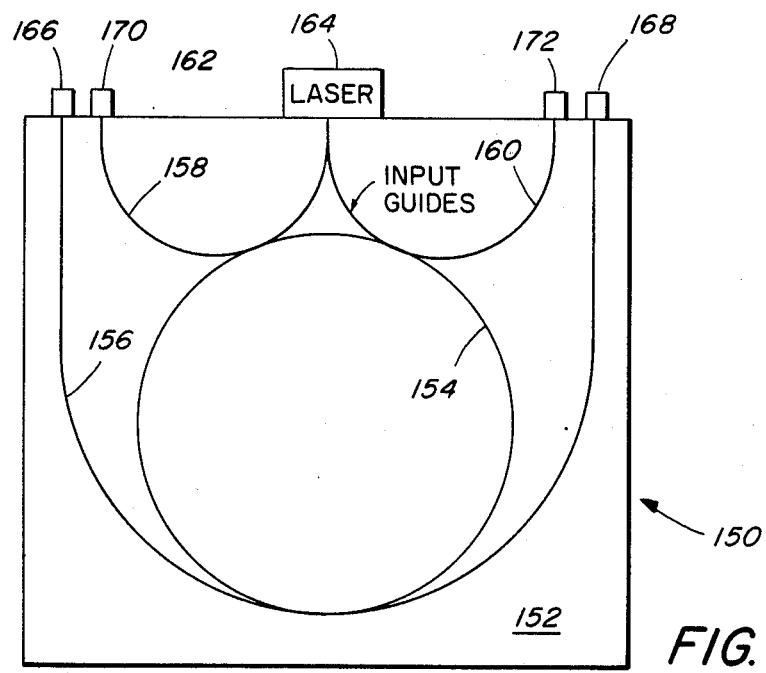
FIG. 6 is a diagram of a physical implementation of the laser gyros disclosed herein.

FIG. 6 is one possible construction of the thin film laser gyros discussed above. A gyro 150 utilizes a glass plate 152 as a substrate. The glass plate 152 is, for example, $\frac{1}{8}$″ thick, but can be thinner if desired. The gyro 150 includes a waveguide resonator 154, an optional output waveguide coupler 156, and input coupler waveguides 158 and 160. All of these waveguides can be photolocked polymer, ion implanted, or ion exchanged (silver in glass). These waveguides are typically 1–2 microns deep and 5–10 microns wide at a wavelength of 0.84 microns. The configuration of the gyro 150 is advantageous in that only a single edge 162 need be polished for component mounting. A laser 164 is preferably a gallium aluminum arsenide laser. A gallium indium arsenide phosphorous laser can also be used for 1.3 micron operation. Direct detectors 166 and 168 and inverse detectors 170 and 172 are also mounted on the single polished edge 162. These detectors are preferably silicon detectors for use at 0.84 microns and it should be understood that other detectors can be used if longer wavelengths are used. All of the electronic components are thus located together on a single polished edge 162 for ease of assembly resulting in a relatively low cost laser gyroscope.

Figure 7:
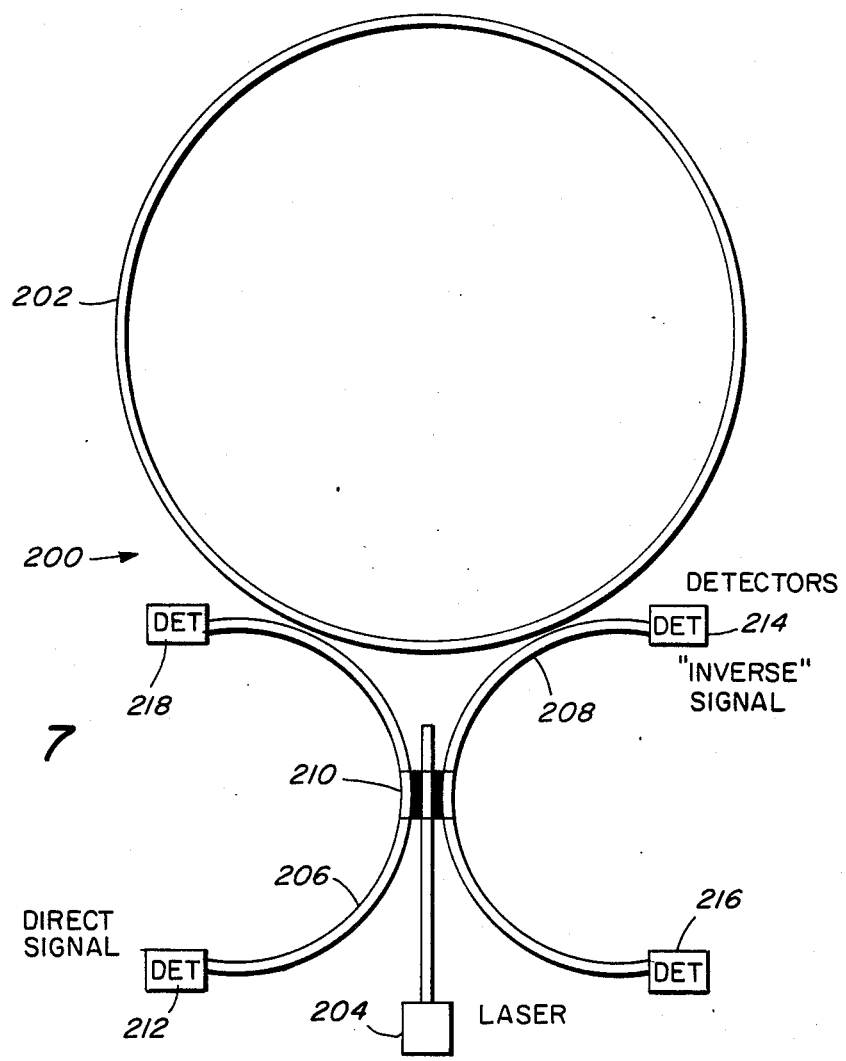
FIG. 7 is an embodiment of a laser gyro utilizing a switch.

Yet another embodiment of a thin film laser gyroscope is shown in FIG. 7. A gyro 200 includes a ring resonator 202 and a laser 204. Couplers 206 and 208 are arranged for coupling energy into and out of the ring resonator 202. An electro-optic switch 210 is provided for selectively coupling light from the laser 204 into either the coupler 206 or the coupler 208. Thus, full power from the laser 204 is coupled into one or the other of the couplers rather than half the power into the input couplers as shown in the earlier embodiments.

The operation of the gyro 200 will now be discussed. Suppose that the electro-optic switch 210 is in a state such that light from the laser 204 couples into the coupler 208. This light will then couple into the resonator 202 to generate a counterclockwise propagating beam. This beam will then couple into the coupler 206 and be detected by a direct detector 212. The inverse signal can be detected at a detector 214. Similarly, when the switch 210 is in its other state, light will couple from the coupler 206 into the resonator generating a clockwise propagating beam. This beam will couple into the coupler 208 and be detected by a direct detector 216. An inverse detector 218 is also provided. The outputs of these detectors will be utilized to infer angular rate as discussed above with the other embodiments.

Figure 8:
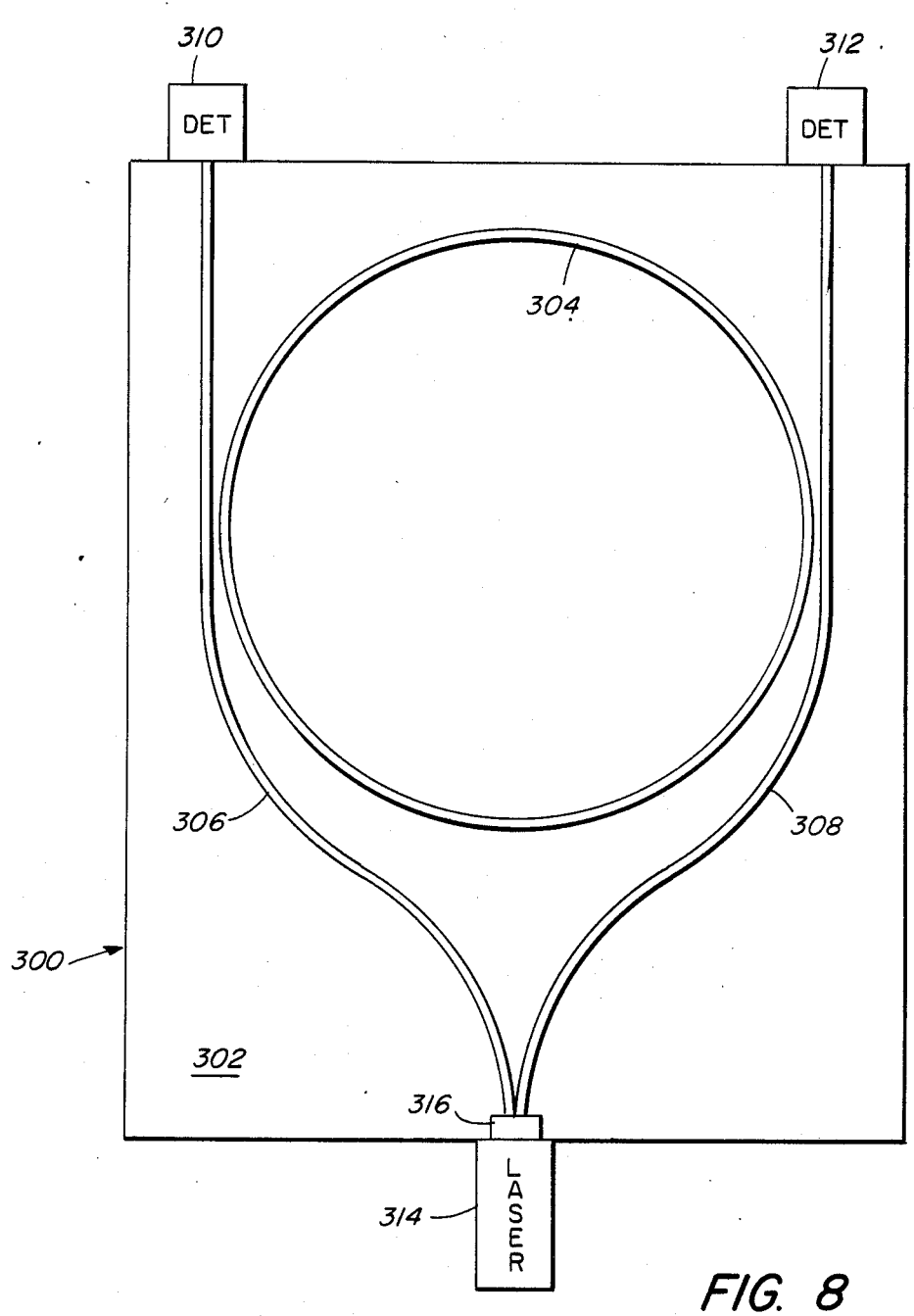
FIG. 8 is an embodiment of a laser gyro eliminating the need for intensity normalization.

FIG. 8 shows another embodiment of a thin film open loop laser gyro for "inverse" operation. A laser gyro 300 includes a glass substrate 302 which includes a ring waveguide resonator 304 and input couplers 306 and 308. Detectors 310 and 312 are provided which are responsive to intensity in the waveguides 306 and 308. A laser diode 314 is adapted for injecting energy into the couplers 306 and 308. The gyro 300 will operate the same way as the "inverse" gyro of FIG. 4. An electro-optic switch or a 3 dB splitter 316 will allocate the energy from the laser 314 into the couplers 306 and 308.

Figure 9:
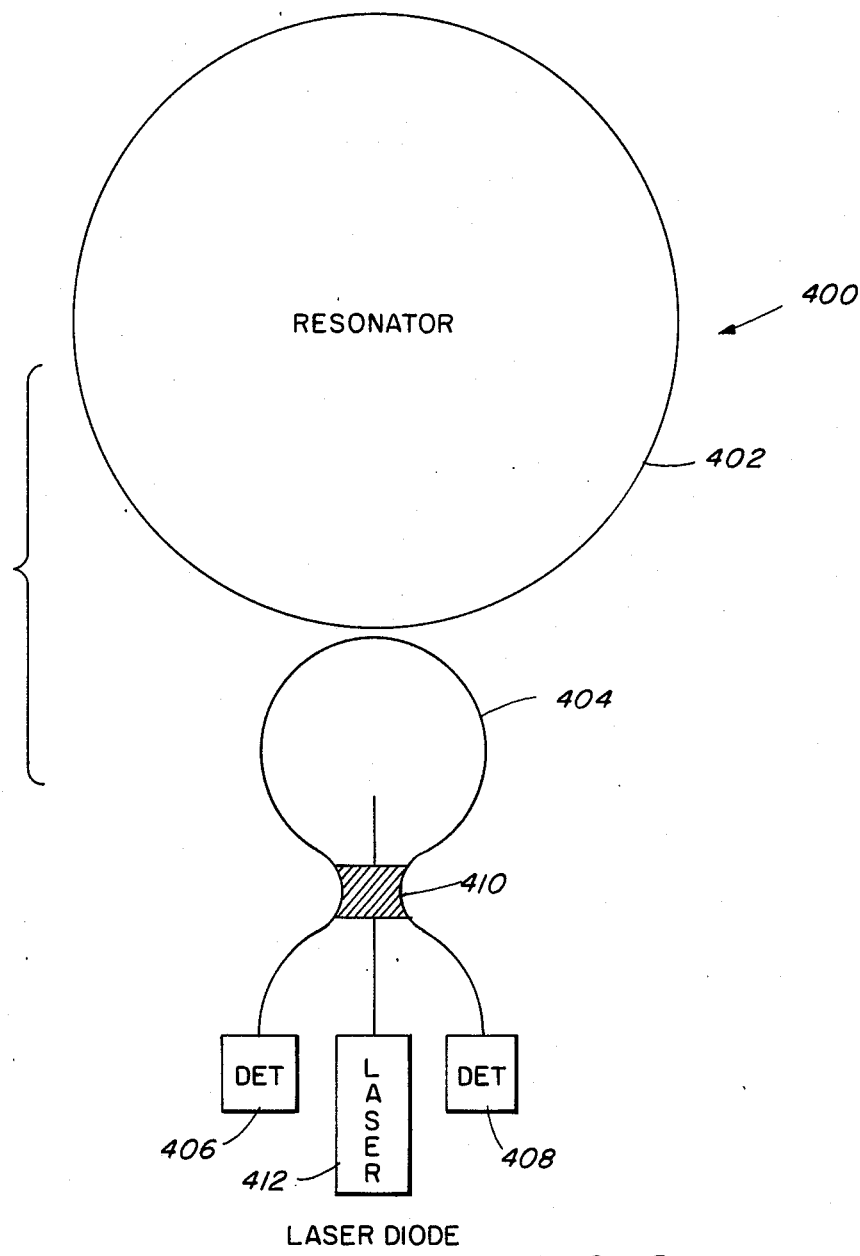
FIG. 9 is another embodiment of an open loop laser gyro employing an electro-optic coupler/switch.

FIG. 9 shows yet another embodiment of the open loop thin film laser gyro disclosed herein. A thin film laser gyro 400 includes a ring waveguide resonator 402 and an input coupler 404. The input coupler 404 terminates in detectors 406 and 408 and an electro-optic switch 410 switches light from a laser diode 412 into one side or the other of the coupler 404. Thus, in one state, the electro-optic switch 410 will direct light from the laser 412 into the right hand portion of the coupler 404. This light will couple into the ring resonator 402 to generate a clockwise propagating beam of light. When the electro-optic switch is in its other state, a counterclockwise propagating beam will be injected into the waveguide resonator 402. The "inverse" detectors 406 and 408 are utilized to determine the rate of the gyro 400 as discussed above in regard to FIG. 4. This mode of operation is advantageous in a number of ways. First, the laser is isolated from feedback from the circulating light, and secondly, the detectors are isolated from backscattered light.

It is thus seen that the objects of this invention have been achieved in that there has been disclosed thin film open loop laser gyro apparatus responsive to angular rotations. The gyros utilize a unique scheme for scanning the frequency of a laser diode above and below the resonance frequency of a ring resonator and use demodulation techniques to determine angular velocities. The disclosed gyros eliminate the need for frequency shifters known in closed loop laser gyros. Thus, the present invention results in a laser gyro substantially simpler and less expensive than those known in the prior art. Those embodiments adapted for "inverse" operation further eliminate the need for an output coupler. It is recognized that modifications and variations will occur to those skilled in the art, and it is intended that all such modifications and variations be included within the scope of the appended claims.

What is claimed is:

1. Open loop laser gyro comprising:
   a laser;
   a ring resonator;
   means for coupling counter-propagating beams of light from said laser into said resonator;
   means for scanning the frequency of said laser across the resonance frequency of said resonator in steps superimposed on a dc level;
   means for detecting the intensity of light in one of said counter propagating beams during said steps;
   means for determining a first difference in intensity of the detected light during said steps;
   means responsive to said first difference of the detected light intensity to alter the dc level of said steps to drive said first difference to zero;
   means for detecting the intensity of light in the other of said counter-propagating beams during said steps; and
   means for determining a second difference in intensity during said steps of light in said other counter-propagating beam, said second difference indicative of the rotation rate of said gyro.

2. The laser gyro of claim 1 wherein said means for determining said first and second differences in intensity of the detected light during said steps comprises a pair of sample and hold elements.

3. The laser gyro of claim 1 wherein said means for determining said first and second differences in intensity of the detected light during said steps comprises a voltage to frequency converter driven by the detector signal, the voltage to frequency output being counted in an up-down counter.

4. The laser gyro of claim 1 including two input couplers and one output coupler.

5. The laser gyro of claim 1 including a substrate having a single polished edge for mounting said laser and for mounting detectors for detecting the intensity of light in said counter-propagating beams.

6. The laser gyro of claim 1 wherein said steps have an extent equal to the width of a resonator line at the $\frac{3}{4}$ power points.

7. The apparatus of claim 1 wherein said laser is a gallium aluminum arsenide laser.

8. The apparatus of claim 1 wherein said detectors are silicon detectors.

9. The apparatus of claim 1 wherein said laser is a gallium indium arsenide phosphorous laser.

10. The apparatus of claim 1 further including a thermoelectric device for controlling the temperature of said laser.

11. Open loop laser gyro comprising:
    a laser;
    a ring resonator;
    first and second input waveguide couplers for coupling counter-propagating beams of light from said laser into said resonator;
    means for scanning the frequency of said laser across the resonance frequency of said resonator in steps superimposed on a dc level;
    means for detecting the intensity of light in one of said input couplers during said steps;
    means for determining a first difference in intensity of the detected light in said one of said couplers during said steps;
    means responsive to said first difference to alter the dc level of said steps to drive said first difference to zero;

means for detecting the intensity of light in the other of said input couplers during said steps; and means for determining a second difference in intensity of light in said other of said input couplers during said steps, said second difference indicative of the rotation rate of said gyro.

12. Open loop laser gyro comprising:

a laser;

a ring resonator;

first and second input waveguide couplers for coupling counter-propagating beams of light from said laser into said resonator;

an output coupler;

means for scanning the frequency of said laser across the resonance frequency of said resonator in steps superimposed on a dc level;

means for detecting the intensity of light in one of said input couplers during said steps and for detecting the intensity of light in said output coupler;

means for determining a first difference in intensity of detected light in said one of said input couplers and said output coupler during said steps;

means responsive to said first difference to alter the dc level of said steps to drive said first difference to zero;

means for detecting the intensity of light in the other of said input couplers during said steps and for determining the intensity of light in said output coupler; and means for determining a second difference in intensity of light in said other of said input couplers and said output coupler during said steps, said second difference indicative of the rotation rate of said gyro.

* * * * *